United States Patent Office 3,808,280
Patented Apr. 30, 1974

3,808,280
MANUFACTURE OF 2,2-DIMETHYL-1,3-DIHYDROXYPROPANE
Franz Merger, Ludwigshafen, Siegfried Winderl, Heidelberg, Erich Haarer, Bad Duerkheim, and Werner Fuchs, Ludwigshafen, Germany, assignors to Badische Anilin- & Soda-Fabrik Aktiengesellschaft, Ludwigshafen, Germany
No Drawing. Filed Nov. 12, 1970, Ser. No. 89,037
Claims priority, application Germany, Nov. 15, 1969, P 19 57 591.8
Int. Cl. C07c 31/18
U.S. Cl. 260—635 A   5 Claims

ABSTRACT OF THE DISCLOSURE

Manufacture of 2,2-dimethyl-1,3-dihydroxypropane by reacting isobutyraldehyde and formaldehyde in the presence of tertiary amines followed by hydrogenation of the reaction mixture with hydrogen in the presence of catalysts.

---

The 2,2-dimethyl-1,3-dihydroxypropane produced by the process of the invention is a valuable starting material for the manufacture of lubricants, plastics, surface coatings and synthetic resins, for example corresponding polyesters.

This invention relates to a process for the manufacture of 2,2-dimethyl-1,3-dihydroxypropane by reacting isobutyraldehyde and formaldehyde in the presence of tertiary amines followed by hydrogenation of the reaction mixture with hydrogen in the presence of catalysts.

U.S. Pat. 2,400,724 discloses that isobutyraldehyde and formaldehyde may be reacted in the presence of an alkali hydroxide into form 2,2-dimethyl-3-hydroxypropanal (aldolization) and that the product may be hydrogenated with hydrogen in the presence of a hydrogenation catalyst to form 2,2-dimethyl-1,3-dihydroxypropane. The drawback of this process is that the aldolization mixture as a rule also contains as a by-product isobutyraldol (2,2,4-trimethyl-3-hydroxypentanal) and salts of organic acids, i.e. esters, due to Cannizzaro and Tischtschenko reactions. Both the catalysts themselves and the alkali salts of organic acids thus formed make hydrogenation more difficult and, in addition, cause partial decomposition of the product during isolation by distillation. Isobutyraldol is hydrogenated to 2,2,4-trimethyl-1,3-dihydroxypentane, while esters formed by Tischtschenko reactions, e.g. the isobutyrate and hydroxyprivalate of 2,2-dimethyl-1,3-dihydroxypropane, are not hydrogenated under the optimum conditions for the hydrogenation of 2,2-dimethyl-3-hydroxypropanal. Consequently the yield and purity of the product are not satisfactory and this process is not economical on a commercial scale.

German printed application No. 1,014,089 proposes to overcome these drawbacks by isolating the 2,2-dimethyl-3-hydroxypropanal prior to hydrogenation. U.S. Pat. 2,895,996 described a method of destroying the portion of unstable hydroxypivalate in the crude 2,2-dimethyl-1,3-dihydroxypropane after hydrogenation, which portion amounts to from 10 to 15%, by saponification with alkali and steam distillation of the saponification mixture.

Another process (French Pat. 1,230,558) makes use of anhydrous solutions of formaldehyde in polar solvents such as alcohols and chlorine compounds and catalysts which are soluble in such solvents, but this process does not provide a satisfactorily pure product in spite of a number of purifying steps after hydrogenation. U.K. Pat. 1,017,618 describes a reaction with the expensive paraformaldehyde in place of formaldehyde in the absence of water with triethylamine as catalyst, which catalyst is separated before hydrogenation is carried out. Here again, the product contains a considerable proportion of products of a Tischtschenko reaction which impair working up and reduce the yield of the desired product. In yet another process (U.K. Pat. 1,048,530) 2,2-dimethyl-3-hydroxypropanal is hydrogenated simultaneously with isobutyraldehyde in the presence of a copper/chromium oxide catalyst. This process also leads to the formation of appreciable quantities of a large number of by-products. An economical disadvantage is the necessity of having to carry out further processing of the isobutanol formed. To avoid major losses of starting materials in the hydrogenation it is necessary for the aqueous phase to be recycled to the hydrogenation reactor, which leads to a further increase in the amount of by-products formed. German printed application DAS 1,804,984 recommends carrying out the reaction of the aldehydes in the presence of an alcohol having from 1 to 3 carbon atoms, removing the alcohol and the excess of isobutyraldehyde by-distillation, extracting the 2,2-dimethyl-3-hydroxypropanal from the residual aqueous solution by means of organic solvents and, finally, washing the extract to remove salts. In all of the above processes commercial-scale operation is not economical and the yield of pure end product is not satisfactory.

It is an object of this invention to provide a new process for the manufacture of 2,2-dimethyl-1,3-dihydroxypropane in high yields and purity in a simpler and more economical manner.

We have found that this object is achieved and that the production of 2,2-dimethyl-1,3-dihydroxypropane by reacting isobutyraldehyde and formaldehyde in the presence of a basic catalyst followed by hydrogenation, in the presence of a hydrogenation catalyst, of the 2,2-dimethyl-3-hydroxypropanal formed is advantageously carried out by effecting the reaction of the aldehyde in the presence of tertiary amines and that the resulting reaction mixture is hydrogenated with hydrogen.

The reaction may be represented by the following equation:

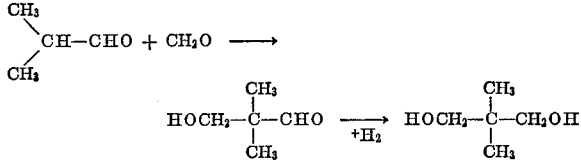

Compared with the prior art, the process of the invention provides 2,2-dimethyl-1,3-dihydroxypropane in good yields and purity in a simpler and more economical manner without the substantial formation of by-products and decomposition products. It is not necessary to carry out additional purifying operations or to use additives which have to be removed prior to hydrogenation.

Surprisingly, these favorable results are also achieved without removing the salts, which are formed during the reaction of the aldehydes, prior to hydrogenation or prior to the subsequent distillation. Since no substantial quantities of ester are present in the reaction mixture prior to hydrogenation, it is not necessary to employ extreme and consequently expensive hydrogenation conditions. The end product usually contains ester impurities in an amount of less than 0.2% by weight.

In the first stage formaldehyde is reacted with isobutyraldehyde in a molar ratio of from 0.5 to 1.5:1, preferably from 1 to 1.1:1. It is advantageous to use the formaldehyde in the form of an aqueous formalin solution, for example of a concentration of 37% by weight, which solution may be stabilized with methanol if desired.

The reaction in the first stage is usually carried out at a temperature of from 20° to 100° C., preferably from 60° to 95° C., continuously or batchwise. Although the reaction may be carried out at subatmospheric or superatmospheric pressure, it is advantageously carried out at atmospheric pressure. In general, only water is used as solvent, the water included in the formalin solution being sufficient in the majority of cases. The amount of water is advantageously between 15 and 50% by weight based on the weight of the reaction mixture.

The reaction in the first stage is carried out in the presence of tertiary amines as catalysts, these usually being present in an amount of from 0.5 to 25, preferably from 2 to 10, mole percent based on isobutyraldehyde. Amines having a basicity constant of at least $10^{-6}$ are preferred. Cycloaliphatic, araliphatic, aromatic and heterocyclic tertiary amines are suitable for use in the present process, aliphatic tertiary amines i.e., tertiary alkylamines having alkyl groups with 1–4 carbon atoms, being particularly suitable; their N-substituents may be the same or different. Tertiary mono- or polyamines, such as diamines, may be used. Suitable amines are, for example, trimethylamine, triethylamine, methyldiethylamine, methyldiisopropylamine, tributylamine, dimethyl-tert-butylamine; N,N'-tetramethylethylenediamine, cyclohexyldimethylamine, tribenzylamine, N-methylpyrrolidine, N-methylpiperidine, N,N'-dimethylpiperazine, N-methylmorpholine and triethanolamine. The duration of the reaction in the first stage is usually from 3 to 180 minutes, advantageously from 10 to 30 minutes.

Advantageously, an amine is chosen whose boiling point is below 100° C. so that the free amine may be readily distilled off immediately after aldolization and the boiling point of any tertiary ammonium formate which may be formed is below the boiling point of 2,2-dimethyl-1,3-dihydroxypropane. For example, the boiling point of diethylammonium formate is 89° C. at 10 mm. Hg. This makes it possible to separate the tertiary ammonium formate as first runnings when distilling the 2,2-dimethyl-1,3-dihydroxypropane after hydrogenation. Tertiary amines whose neutralization product with formic acid is difficult or impossible to separate by distillation may, if desired, be removed without detriment by passing the crude hydrogenation mixture over a preferably sulfonic cation exchanger.

The tertiary amines may be replaced by basic, in particular macroporous, ion exchangers bearing such tertiary amino groups, for example poly(dimethylaminoalkylstyrene). When the exchangers are used in continuous operation, it is usual to employ relatively long residence times, for example from 3 to 15 hours, preferably from 5 to 10 hours, when macroporous poly(dimethylaminoalkylstyrene) is used.

The reaction in the first stage may be carried out as follows: isobutyraldehyde, formalin and the amine are mixed together in the specified proportions at room temperature in, for example, a stirred vessel. The exothermic reaction may be accelerated by the application of heat, advantageously under reflux. The reaction mixture is then maintained at the reaction temperature for from 20 to 40 minutes. During this reaction time the temperature may rise within the limits stated, for example the reaction may be started at 60° C. and the mixture heated to 95° C. under reflux after the amine has been added. The mixture may be similarly reacted in a tubular reactor containing a packing to facilitate mixing, the residue times being from 20 to 60 minutes at a temperature of from 90 to 95° C.

The resulting reaction mixture contains the end product in such purity that the mixture may be advantageously passed to the hydrogenation stage without isolating the 2,2-dimethyl-3-hydroxypropanol. The impurities consist of esters, aldoxanes and acetals of 2,2-dimethyl-3-hydroxypropanal and the formate of the tertiary amine used and are generally present in an amount of from 2 to 6% by weight based on 2,2-dimethyl-3-hydroxypropanal. The tertiary amine may be recovered after the aldolization step or after the hydrogenation step by distillation.

The preferred hydrogenation catalysts consist in general of one or more metals having an atomic number between 24 and 29, usually cobalt, copper, manganese and/or nickel catalysts, for example corresponding sintered catalysts. The metals in the catalyst may also be present in the form of their oxides and/or in admixture with phosphoric acid. Advantageous catalysts of the said class contain from 3 to 30% by weight of copper, from 0.5 to 10% by weight of manganese, and from 10 to 80% by weight of cobalt or nickel. If desired, from 0.1 to 5% by weight of phosphoric acid based on the total amount of metal may be added.

During hydrogenation, the hydrogenation catalyst is usually used in an amount of from 5 to 30% by weight based on 2,2-dimethyl-3-hydroxypropanal. It may be supported on a carrier suitable for hydrogenation, for example silicon dioxide, in which case the amount of catalyst used is usually from 10 to 40% by weight of the catalyst/support mixture.

Very good results are obtained using, for example, the following catalyst mixtures:

(a) 70.5% Co, 19.7% Cu, 5.4% Mn, 4.2% phosphoric acid;
(b) 15% Ni, 6.1% Cu, 1.5% Mn, 0.9% phosphoric acid on $SiO_2$;
(c) 15% Ni, 5.2% Cu, 1.3% Mn on $SiO_2$.

The said advantageous results may also be achieved with these catalysts in the process of the invention when up to 70%, advantageously from 30 to 40%, by weight of water is present in the reaction mixture; for example, in the case of catalyst (a) no reduction in the reaction rate or selectivity is observed even after more than 4,000 hours of operation.

As a rule, hydrogen is added to the reaction mixture at the commencement of and during hydrogenation at such a rate that an appropriate reaction pressure, advantageously between 150 and 300 atmospheres, is set up at the hydrogenation temperature. Hydrogenation is, in general, carried out at a temperature of from 80° to 200° C., preferably from 120° to 190° C., batchwise or continuously. To set up the desired pressure, inert gases such as nitrogen may also be used. The residence time in the hydrogenation zone is normally from 15 to 300 minutes. The hydrogenation may be carried out as follows:

The reaction mixture from the first stage is passed, with or without separation of the amine, via a column by means of injection pumps to a high-pressure hydrogenation reactor packed with the catalyst, where it is hydrogenated with hydrogen under the above temperature and pressure conditions. The mixture discharged from the reactor is either passed immediately to a continuous fractionating column or collected in storage vessels and fractionated batchwise. The number of trays is advantageously from 10 to 40, preferably from 15 to 20. In general, the pressure in the fractionating column is so chosen that the boiling point of the end product is higher than its melting point (M.P. 129° C.), i.e. above 50 mm. Hg. All or only some of the stages of the process may be operated continuously.

The product of the process of the invention, namely 2,2-dimethyl-1,3-dihydroxypropane, is a valuable starting material for the manufacture of lubricants, plastics, surface coatings and synthetic resins, for example corresponding polyesters. For uses thereof see the cited literature references and Ullmann's Encyklopädie der technischen Chemie, vol. 15, pp. 292 et seq.

The invention is further illustrated by the following examples in which parts are by weight unless otherwise stated. Parts by weight bear the same relation to parts by volume as the kilogram to the liter.

EXAMPLE 1

144 parts of isobutyraldehyde and 162 parts of 37% aqueous formaldehyde solution are heated under nitrogen to 60° C. 20 parts of triethylamine are allowed to flow in with stirring and under reflux in the course of 5 minutes, and the mixture is then heated in the course of from 10 to 15 minutes to 93–95° C. and kept at this temperature for a further 10 minutes, from 20 to 25 parts of triethylamine and water being distilled off during the last 5 minutes. The homogeneous mixture is then passed into a tumbling autoclave which has been flushed with nitrogen and which contains 30 parts of a reduced catalyst (15% Ni, 5.2% Cu and 1.3% Mn on silicic acid support).

Hydrogen is first of all added at a pressure of 100 atmospheres, the temperature then being raised to 150° C. and hydrogenation completed at a hydrogen pressure of 280 atmospheres in the course of 2 hours. The discharged hydrogenation mixture is freed from catalyst by filtration and then fractionally distilled in a column charged with glass packing. Following the first runnings, which consist essentially of water, triethylamine, methanol and triethylammonium formate, there are obtained 181 parts 2,2-dimethyl - 1,3 - dihydroxypropane, B.P. 138–140° C. (M.P. 127–128° C.; ester content 0.11% by weight), equivalent to a yield of 87% of theory based on each of the starting materials.

To completely recover the triethylamine, the aqueous first runnings are adjusted to a pH of from 12 to 13 with a little sodium hydroxide solution and distilled at atmospheric pressure to isolate the triethylamine. The distillate thus obtained contains from 50–60% by weight of triethylamine.

EXAMPLE 2

Through a vertical reaction tube charged with glass packing and provided with a sieve plate and, at the top, a reflux condenser, there are passed per hour, via separate feed lines (a) a mixture of 72 parts of isobutyraldehyde and 8 parts of triethylamine and (b) 81 parts of a 37% aqueous formaldehyde solution, the residence time being 40 minutes at a temperature of from 90 to 95° C. The reaction product leaving the top of the tube is continuously introduced into a high-pressure reactor by an injection pump together with hydrogen, the reactor being packed with a reduced catalyst of the following composition: 70.5% Co, 19.7% Cu, 5.2% Mn and 4.2% phosphoric acid, by weight. Hydrogenation is effected at 170° C. and 280 atmospheres. The amount of off-gas is 200,000 parts by volume of hydrogen per hour. The discharged crude product is fractionated in a packed column. After a reaction period of 5 hours there are obtained 464 parts of 2,2-dimethyl-1,3-dihydroxypropane, B.P. 138–139° C. at 70 mm. Hg (M.P. 127.5–128.5° C.; ester content 0.09% by weight), equivalent to 89.2% of theory based on each of the starting materials used.

What is claimed is:

1. A process for the manufacture of 2,2-dimethyl-1,3-dihydroxypropane which comprises reacting at 60 to 95° C. isobutyraldehyde and aqueous formaldehyde at a molar ratio of 1:0.5–1.5, in the presence of 0.5–25 mol percent, based on the isobutyraldehyde, of a tertiary alkylamine having alkyl groups with 1–4 carbon atoms, N,N' - tetramethylethylenediamine, cyclohexyldimethylamine, tribenzylamine, N-methylpyrrolidine, N-methylpiperidine, N,N'-dimethylpiperidine, N-methylmorpholine or triethanolamine the amount of water in the reaction mixture being between 15 and 50% by weight to obtain 2,2-dimethyl-3-hydroxypropanol in an aqueous reaction mixture containing as by-product impurities 2–6%, based on the 2,2-dimethyl-3-hydroxypropanal, of esters, aldoxanes, and acetals of 2,2-dimethyl-3-hydroxypropanal and the formate of said tertiary amine, and hydrogenating at 80–200° C. the resultant aqueous reaction mixture containing said by-product impurities in the presence of a hydrogenation catalyst embodying as the active metal at least one of cobalt, copper, manganese and nickel to convert the 2,2-dimethyl-3-hydroxypropanal in the reaction mixture to 2,2-dimethyl-1,3-dihydroxypropane.

2. A process as claimed in claim 1 wherein said amine is a tertiary alkylamine selected from the group consisting of trimethylamine, triethylamine, methyldiethylamine, methyldiisopropylamine, tributylamine and dimethyl-tert-butylamine.

3. A process as claimed in claim 1 wherein said molar ratio of isobutyraldehyde to formaldehyde is 1:1–1.1.

4. A process as claimed in claim 1 wherein said hydrogenation catalyst contains from 3 to 30% by weight of copper, from 0.5 to 10% by weight of manganese and from 10 to 80% by weight of cobalt or nickel.

5. A process as claimed in claim 1 wherein the reaction is carried out with the tertiary amines present in an amount of from 2 to 10 mole percent based on isobutyraldehyde.

References Cited

UNITED STATES PATENTS

| | | | |
|---|---|---|---|
| 2,400,724 | 5/1946 | Walker | 260—635 A |
| 2,760,983 | 8/1956 | MacLean | 260—635 P |
| 2,818,443 | 12/1957 | Robeson | 260—635 P |
| 3,340,312 | 9/1967 | Duke et al. | 260—635 A |
| 2,364,925 | 12/1944 | Spurlin | 260—635 P |
| 2,811,562 | 10/1957 | Hagemeyer | 260—635 P |
| 2,865,819 | 12/1958 | Hagemeyer et al. | 260—635 P |
| 3,449,445 | 6/1969 | Wetherill | 260—635 P |
| 3,478,112 | 11/1969 | Adam et al. | 260—635 D |

FOREIGN PATENTS

| | | | |
|---|---|---|---|
| 145,232 | 5/1962 | U.S.S.R. | 260—635 A |
| 1,556,790 | 12/1968 | France | 260—638 B |
| 1,017,618 | 1/1966 | Great Britain | 260—635 A |

OTHER REFERENCES

Ogata et al., "J. Chem. Soc.," No. 10 (1967), pp. 1013 to 1020.

Rohm et al., Technical Notes (1963), pp. 1–8.

JOSEPH E. EVANS, Primary Examiner

U.S. Cl. X.R.

260—247, 268, 293.51, 326.8, 501.1, 501.17, 501.2, 602, 635 P, 637 P

UNITED STATES PATENT AND TRADEMARK OFFICE
CERTIFICATE OF CORRECTION

PATENT NO. : 3,808,280
DATED : April 30, 1974
INVENTOR(S) : FRANZ MERGER ET AL

It is certified that error appears in the above-identified patent and that said Letters Patent are hereby corrected as shown below:

Column 6, claim 1, line 5, "N,N'-dimethylpiperidine, N-methylmorpholne" should read --N,N'-dimethylpiperazine, N-methylmorpholine--.

Column 6, claim 1, line 8, "2,2-dimethyl-3-hydroxypropanol," should read --2,2-dimethyl-3-hydroxypropanal--

Signed and Sealed this

Twentieth Day of March 1979

[SEAL]

Attest:

RUTH C. MASON
Attesting Officer

DONALD W. BANNER
Commissioner of Patents and Trademarks